United States Patent
Kim et al.

(10) Patent No.: US 7,602,586 B2
(45) Date of Patent: Oct. 13, 2009

(54) HEAD PARKING RAMP FOR DATA STORAGE DEVICE

(75) Inventors: Do-wan Kim, Hwaseong-si (KR);
Chul-woo Lee, Seongnam-si (KR);
Ki-tag Jeong, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 403 days.

(21) Appl. No.: 11/142,750

(22) Filed: Jun. 2, 2005

(65) Prior Publication Data

US 2005/0286171 A1    Dec. 29, 2005

(30) Foreign Application Priority Data

Jun. 24, 2004    (KR)    ............ 10-2004-0047617

(51) Int. Cl.
*G11B 5/54*    (2006.01)
*G11B 21/22*    (2006.01)

(52) U.S. Cl. .................. 360/254.7; 360/254.8

(58) Field of Classification Search .......... 360/254.7, 360/254.8, 254.9, 255, 354.4, 354.5
See application file for complete search history.

(56) References Cited

U.S. PATENT DOCUMENTS

| | | | | |
|---|---|---|---|---|
| 4,782,417 A | * | 11/1988 | Tanaka et al. ............ | 360/133 |
| 4,933,785 A | * | 6/1990 | Morehouse et al. ...... | 360/78.04 |
| 5,757,587 A | * | 5/1998 | Berg et al. ............... | 360/254.7 |
| 6,055,134 A | * | 4/2000 | Boutaghou ............... | 360/254.4 |
| 6,538,851 B1 | * | 3/2003 | Sasaki ..................... | 360/254.8 |
| 6,570,741 B2 | * | 5/2003 | Yamanouchi ............ | 360/254.4 |
| 6,583,963 B2 | * | 6/2003 | Boutaghou ............... | 360/254.7 |
| 2002/0131212 A1 | * | 9/2002 | Yanagihara-shi ........ | 360/254.8 |
| 2003/0169536 A1 | * | 9/2003 | Suzuki ..................... | 360/255 |

FOREIGN PATENT DOCUMENTS

| | | |
|---|---|---|
| JP | 2001-014820 | 1/2001 |
| JP | 2002-109842 | 4/2002 |
| JP | 2002-279744 | 9/2002 |

* cited by examiner

*Primary Examiner*—Andrea L Wellington
*Assistant Examiner*—Adam B Dravininkas
(74) *Attorney, Agent, or Firm*—Staas & Halsey LLP

(57) ABSTRACT

A head parking ramp for a data storage device includes a fixed portion fixed to a base member, a support portion extending from the fixed portion toward the disk and supporting an end portion of an actuator where the read/write head is installed, an extended portion extending from the fixed portion toward the disk, having a lead end portion overlapping each of an upper surface and a lower surface of an outer circumferential portion of the disk, and having a plurality of disk facing surfaces facing each of the upper and lower surfaces of the disk, and a protruding surface protruding from each of the disk facing surfaces of the extended portion at a position corresponding to an edge portion of the disk and restricting a vibration of the disk as the edge portion of the disk contacts the protrusion surface when the disk vibrates.

8 Claims, 6 Drawing Sheets

HEAD PARKING RAMP FOR DATA STORAGE DEVICE

CROSS-REFERENCE TO RELATED APPLICATION

This application claims the priority of Korean Patent Application No. 2004-0047617, filed on Jun. 24, 2004, in the Korean Intellectual Property Office, the disclosure of which is incorporated herein by reference.

BACKGROUND OF THE INVENTION

1. Field of the Invention

The present invention relates to a data storage device, and more particularly, to a head parking ramp for a data storage device to stably park a read/write head when the operation of the data storage device stops.

2. Description of Related Art

A hard disk drive (HDD), which is one of data storage devices used for computers, reproduces data stored on a disk or records data on the disk using a read/write head. In the HDD, to perform the above functions, the head is moved to a desired position by an actuator by being lifted to a specified height from a recording surface of a rotating disk.

When the HDD is not in operation, that is, when the disk is not rotating, the head is parked at a position out of the recording surface of the disk to prevent the head from colliding against the recording surface of the disk. Such a head parking system can be classified into a contact start stop (CSS) method and a ramp loading method. In the CSS method, a parking zone where data is not recorded is provided in an inner circumferential area of the disk and the head contacts the parking zone and is parked thereon. In the ramp loading method, a ramp is located outside the disk and the head is parked on the ramp.

According to the CSS method, since the head contacts the parking zone and parked thereon, when an impact is applied to the disk when the disk drive is not in operation, that is, the disk is not rotating, the disk and the head collide with each other as a result of the impact. Accordingly, the head is damaged so that a read/write performance of the head is considerably deteriorated.

Thus, for a portable hard disk drive, for example, a mobile disk drive using a 2.5", 1", or 0.85" disk, a ramp loading type head parking system is widely adopted, in which the head is parked on a ramp separated from the disk when the disk drive does not operate so that a damage to the head due to collision between the disk and head is prevented, FIG. 1 is a plan view illustrating a hard disk drive adopting a conventional ramp loading type head parking system. FIG. 2 is a magnified perspective view illustrating the head parking ramp of FIG. 1. FIG. 3 is a side view illustrating the ramp of FIG. 2.

Referring FIGS. 1 through 3, the hard disk drive includes a spindle motor 12 installed on a base member 10, at least one disk 20 installed on the spindle motor 12, and an actuator 30 moving a slider 35 having a read/write head for reproduction and recording of data to a specified position on the disk 20. The actuator 30 includes a swing arm 32 rotatably coupled to a pivot 31 installed on the base member 10, and a suspension 33 installed at an end portion of the swing arm 32 and supporting the slider 35 having the head to be elastically biased toward a surface of the disk 20. The slider 35 in a state of being attached to a flexure 34 is supported by the suspension 33.

A voice coil motor (VCM) to rotate the swing arm 32 is provided at the actuator 30. The VCM includes a VCM coil 37 coupled to the other end portion of the swing arm 32 and a magnet 38 arranged to face the VCM coil 37. The VCM configured as above is controlled by a servo control system and rotates the swing arm 32 in a direction following the Fleming's left hand rule by interaction between current applied to the VCM coil 37 and a magnetic field formed by a magnet 38. When the power of the hard disk drive is on and the disk 20 starts to rotate in a direction D, the VCM rotates the swing arm 32 counterclockwise in a direction A so that the slider 35 having the head moves to the recording surface of the disk 20. The slider 35 is lifted to a specified height from the surface of the disk 20 by a lift force generated by the disk 20 that is rotating. In this state, the head mounted on the slider 35 performs a function of reproducing or recording data with respect to the recording surface of the disk 20.

When the hard disk drive is not in operation, that is, when the disk 20 stops rotating, the head is parked at a position out of the recording surface of the disk 20 so as not to collide the recording surface of the disk 20. To this end, a ramp 40 is installed outside the disk 20 and an end-tab 36 supported by the ramp 40 is provided at an end portion of the suspension 33.

The ramp 40 includes a fixed portion 41 fixed to the base member 10 and a support portion 42 extending from the fixed portion 41 toward the disk 20 and having a support surface 43 supporting the end-tab 36 by overlapping each of the upper surface and the lower surface of the outer circumferential portion of the disk 20. The end portion of the support surface 43 close to the disk 20 is inclined so that loading and unloading of the end-tab 36 are smoothly performed. The end-tab 36 typically bulges toward the support surface 43 to reduce a contact area with respect to the support surface 43 of the ramp 40.

When the head is parked on the ramp 40, the actuator 30 is arbitrarily rotated by an external impact or vibration applied to the disk drive so that the head can escape from the ramp 40 and move to the recording surface of the disk 20. In this case, since the head contacts the recording surface of the disk 20, the head and the recording surface of the disk 20 can be damaged. Thus, in a state in which the disk 20 stops rotation and the head is parked on the ramp 40, to prevent the actuator 30 from rotating arbitrarily, an actuator latch 50 is provided to lock the actuator 30 at a particular position.

In the ramp loading type head disk drive configured as above, when an external impact is received, vibration is generated in the disk 20. When the impact applied to the disk 20 is relatively strong, as shown in FIG. 3, the disk 20 vibrates up and down and the upper and lower surfaces of the outer circumstantial portion of the disk 20 contact a disk facing surface 44 of the support portion 42 of the ramp 40. As a result, the data recording surface of the disk 20 and data recorded on the recording surface are damaged.

FIG. 4 shows a ramp for head parking which is disclosed in Japanese Patent Publication No. 2002-279744. Referring to FIG. 4, a support portion 62 of a ramp 60 includes a support surface 63 supporting a read/write head and a disk facing surface 64 facing the disk 20. The disk facing surface 64 is inclined. When the disk 20 vibrates due to an external impact, an edge portion of the disk 20 first contacts the disk facing surface 64 so that the recording surface of the disk 20 does not contact the disk facing surface 64. Thus, a problem that the recording surface of the disk 20 is damaged by colliding against the disk facing surface 64 is prevented.

However, when the disk 20 collides against the disk facing surface 64 of the support portion 62, an impact is applied to the support portion 62 that is relatively thin. When such an impact is repeated, the support portion 62 can be deformed so that the head loading/unloading function of the support portion 62 is deteriorated.

BRIEF SUMMARY

To solve the above and/or other problems, the present invention provides a head parking ramp for a data storage device which can prevent damage to the recording surface of the disk and deformation of the head support portion by an external impact.

According to an aspect of the present invention, there is provided a head parking ramp for a data storage device to park a read/write head at a position out of a disk, the head parking ramp including a fixed portion fixed to a base member, an extended portion extending from the fixed portion toward the disk, having a lead end portion overlapping each of an upper surface and a lower surface of an outer circumferential portion of the disk, and having a plurality of disk facing surfaces facing each of the upper and lower surfaces of the disk, and a protruding surface protruding from each of the disk facing surfaces of the extended portion at a position corresponding to an edge portion of the disk and restricting a vibration of the disk as the edge portion of the disk contacts the protrusion surface when the disk vibrates.

The protruding surface may be an inclined surface. The protruding surface may be a curved surface bulging toward the edge portion of the disk. A chamfer surface formed on the edge portion of the disk may contact the protruding surface.

According to another aspect of the present invention, there is provided a head parking ramp for a data storage device to park a read/write head at a position out of a disk, the head parking ramp including a fixed portion fixed to a base member, a support portion extending from the fixed portion toward the disk and supporting an end portion of an actuator where the read/write head is installed, an extended portion extending from the fixed portion toward the disk, having a lead end portion overlapping each of an upper surface and a lower surface of an outer circumferential portion of the disk, and having a plurality of disk facing surfaces facing each of the upper and lower surfaces of the disk, and a plurality of buffer protrusions arranged between the disk facing surfaces of the extended portion and the edge portion of the disk to be separated a specified distance from each of the disk facing surfaces and the disk, and restricting a vibration of the disk and absorbing an impact by allowing the edge portion of the disk contact the buffer protrusions when the disk vibrates.

The buffer protrusions may have a plate shape and protrude from the extended portion parallel to the disk facing surfaces. The buffer protrusions may have a function of a leaf spring. The disk facing surfaces of the buffer protrusions may be inclined surfaces.

According to another aspect of the present invention, there is provided a head parking ramp for a data storage device to park a read/write head at a position out of a disk, the head parking ramp including a fixed portion fixed to a base member, a support portion extending from the fixed portion toward the disk, having a lead end portion overlapping each of an upper surface and a lower surface of an outer circumferential portion of the disk, having a support surfaces supporting an end portion of an actuator where the read/write head is mounted, and having a plurality of disk facing surfaces facing each of the upper and lower surfaces of the disk, and a plurality of buffer protrusions arranged between the disk facing surfaces of the support portion and the edge portion of the disk to be separated a specified distance from each of the disk facing surfaces and the disk, and restricting a vibration of the disk and absorbing an impact by allowing the edge portion of the disk contact the buffer protrusions when the disk vibrates.

According to another aspect of the present invention, there is provided a head parking ramp system, including: a disk having chamfered outer edges; a support portion extending from a fixed portion toward the disk and supporting an end portion of an actuator where a read/write head is located; an extended portion extending in a direction from the fixed portion toward the disk, having end portions extending in the direction adjacent to opposing surfaces of the disk, each end portion having a disk facing surface facing an adjacent surface of the disk; and disk edge collision absorbing surfaces at each of the disk facing surfaces proximate to the edges of the disk.

According to another embodiment of the present invention, there is provided a head parking ramp system, including: a disk having chamfered outer edges; a support portion extending from a fixed portion toward the disk and supporting an end portion of an actuator where a read/write head is located; an extended portion extending in a direction from the fixed portion toward the disk, having end portions extending in the direction adjacent to opposing surfaces of the disk, each end portion having a disk facing surface facing an adjacent surface of the disk; and a plurality of buffer protrusions arranged between the disk facing surfaces and the outer edges, the buffer protrusions being spaced from each of the disk facing surfaces and the disk, and restricting a vibration of the disk and absorbing an impact by allowing the edge portion of the disk contact the buffer protrusions when the disk vibrates.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
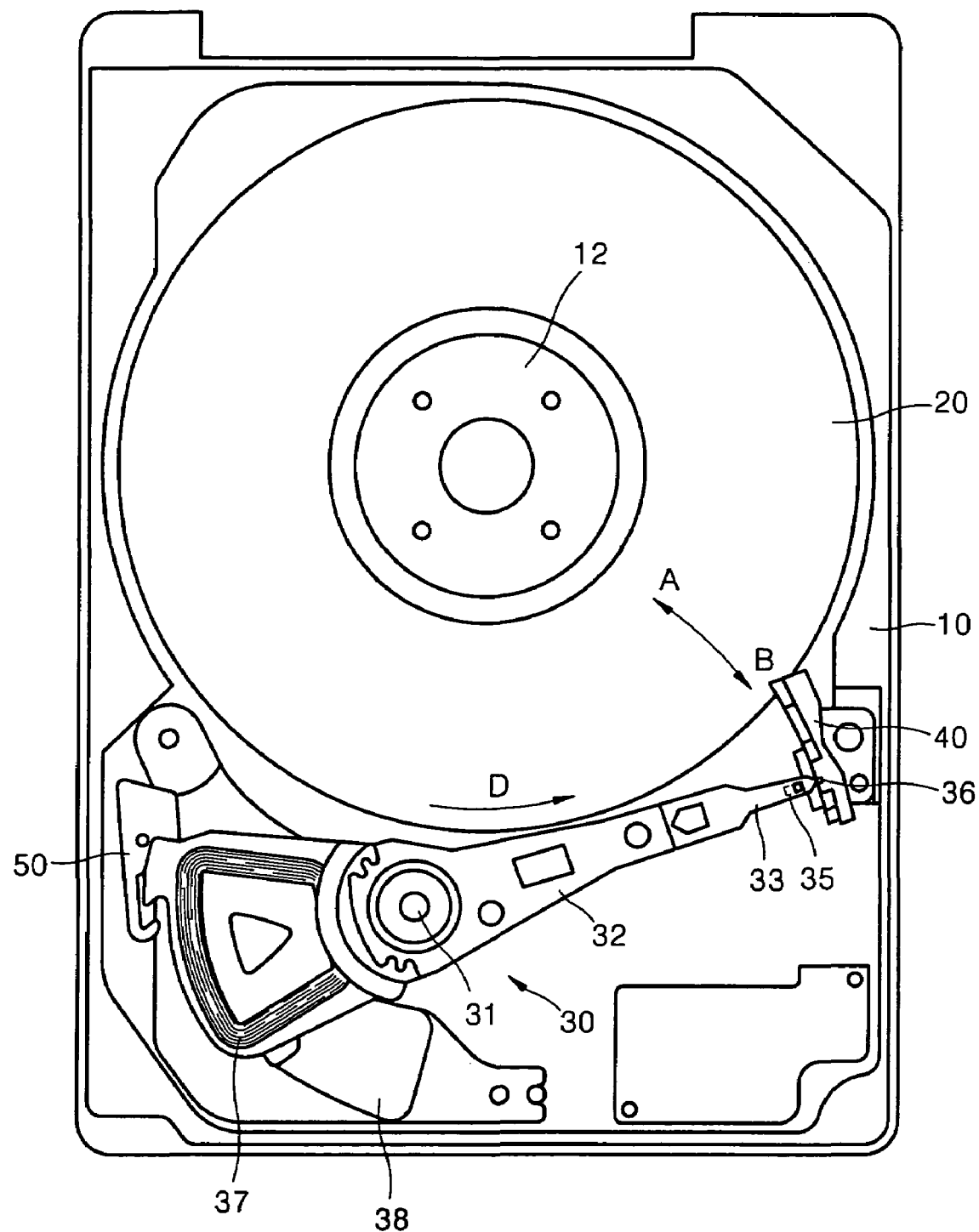
FIG. 1 is a plan view illustrating a hard disk drive using a conventional ramp loading type head parking system.
Figure 2:
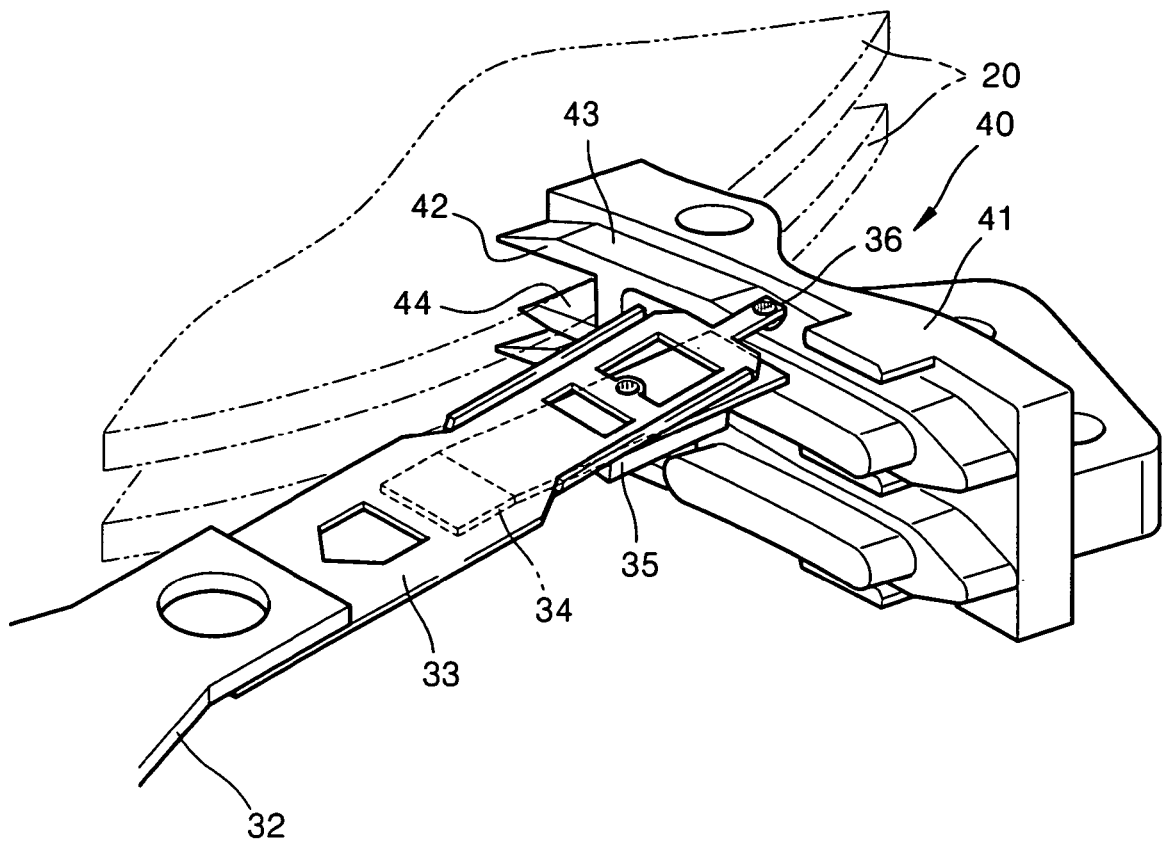
FIG. 2 is a magnified perspective view illustrating the head parking ramp of FIG. 1.
Figure 3:
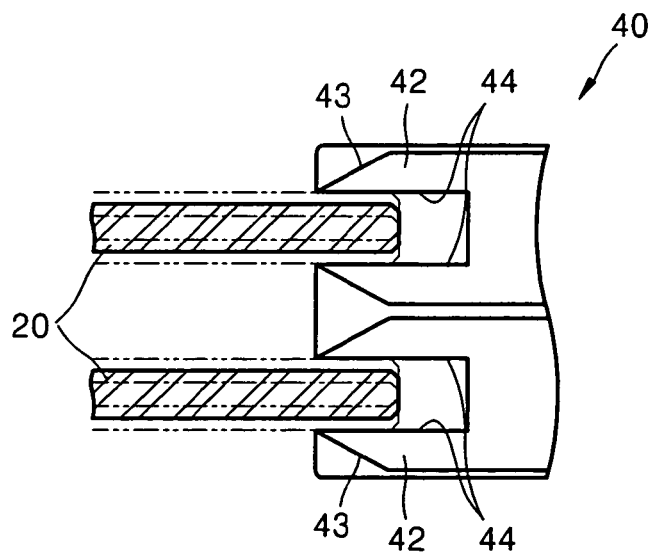
FIG. 3 is a side view illustrating the ramp of FIG. 2.
Figure 4:
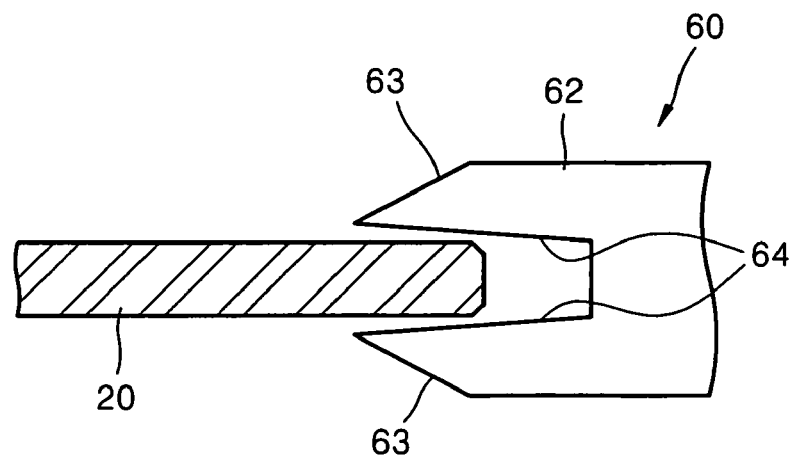
FIG. 4 is a side view illustrating another example of a conventional head parking ramp.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 5:
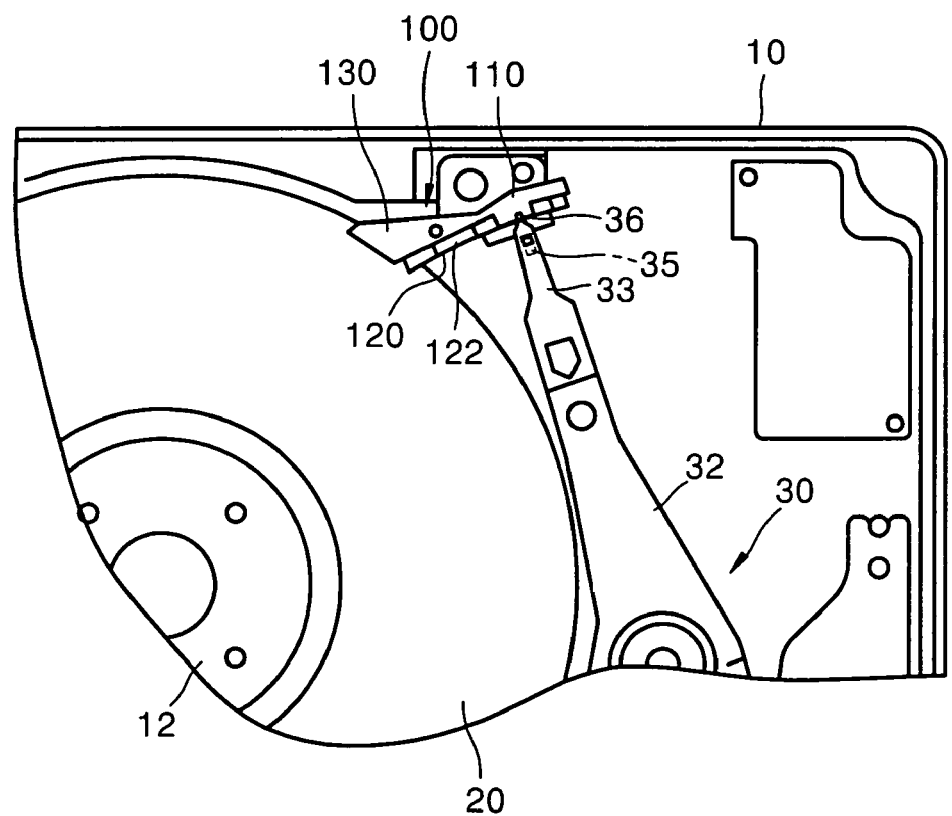
FIG. 5 is a plan view illustrating part of a hard disk drive having a head parking ramp according to a first embodiment of the present invention.
Figure 6:
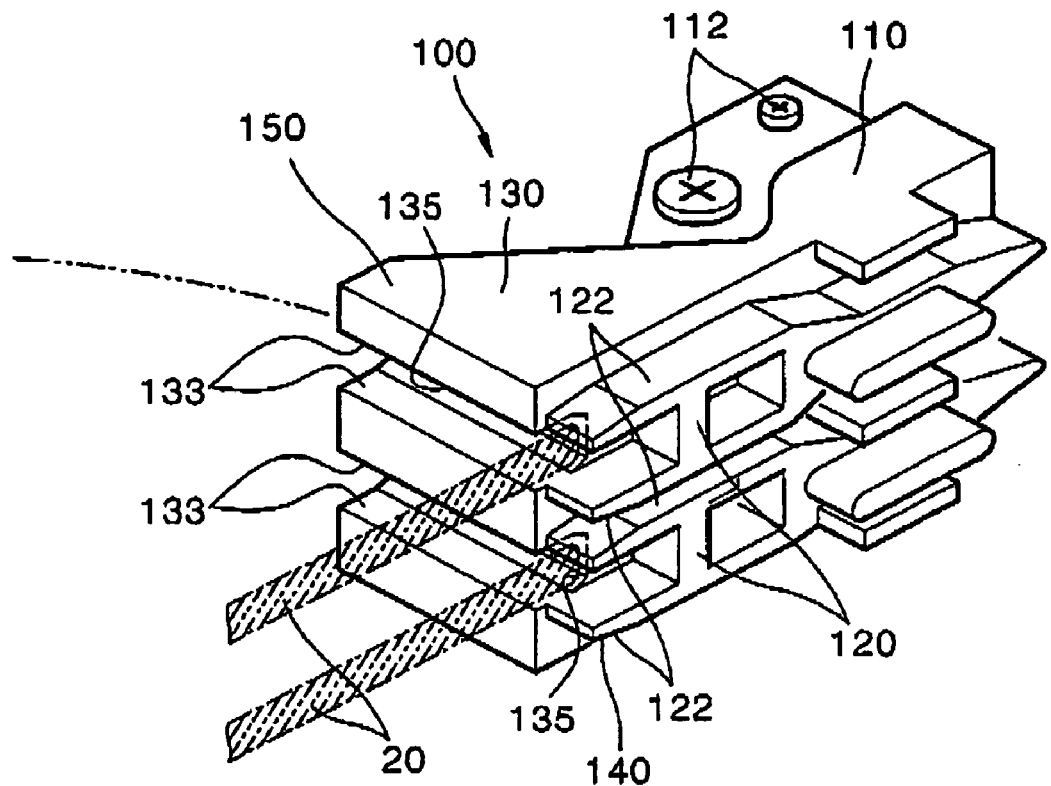
FIG. 6 is a magnified perspective view illustrating the ramp of FIG. 5.
Figure 7:
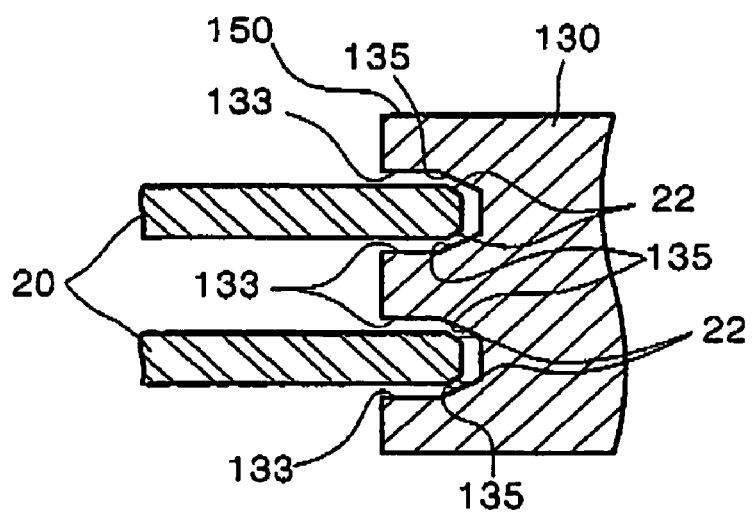
FIG. 7 is a vertical sectional view illustrating an extended portion of the ramp of FIG. 6;.

Referring to FIGS. 5, 6, and 7, a head parking ramp 100 according to a first embodiment of the present invention is used to park a read/write head at a position out of the disk 20 when the disk 20 stops rotating and adopted in a data storage device such as a hard disk drive. In detail, the ramp 100 is installed outside the disk 20. When a disk drive stops operation, the end-tab 36 extending from an end portion of the suspension 33 of the actuator 30 contacts and is supported by a support surface 122 of the support portion 120 of the ramp 100.

The ramp 100 according to the first embodiment of the present invention includes a fixed portion 110 fixed to the base member 10 of a hard disk drive, a support portion 120 supporting an end portion of the actuator 30, that is, the end-tab 36, an extended portion 130 extending from the fixed portion 110 toward the disk 20, and a protruding surface 135 provided at the extended portion 130 to restrict vibration of the disk 20.

The fixed portion 110 is fixed to the base member 10 of the hard disk drive using a fixing screw 112 or other means. The fixed portion 110 is arranged close to an outer edge portion of the disk 20.

The support portion 120 extends from the fixed portion 110 toward the disk 20 such that a leading end. portion 140, that is, an end portion toward the disk 20, overlaps each of upper and lower surfaces of an outer circumferential portion of the disk 20. The support portion 120 has support surfaces 122 contacting and supporting the end portion 140, that is, the end-tab 36, of the actuator 30 having the head mounted thereon when the disk 20 stops rotation. The leading end portion 140 of each of the support surfaces 122 is inclined so that loading and unloading of the end-tab 36 are performed smoothly. The leading end portion of the support portion 120 is relatively thin to avoid contact with the disk 20 and secure a space for movement of the end-tab 36.

The extended portion 130 extends from the fixed portion 110 toward the disk 20 such that a leading end portion 150 thereof, that is, an end portion toward the disk 20, overlaps each of the upper and lower surfaces of the outer circumferential portion of the disk 20. The extended portion 130 has disk facing surfaces 33 facing each of the upper and lower surfaces of the disk 20. Since the leading end portion 150 of the extended portion 130 does not need to secure the space for movement of the end-tab 36, the leading end portion of the extended portion 130 can be relatively thicker than the leading end portion of the support portion 120.

The protruding surface 135 is formed at each of disk facing surfaces 133 of the extended portion 130. The protruding surface 135 restricts vibrations of the disk 20 due to an external impact. In detail, the protruding surface 135 protrudes at a position of each of the disk facing surfaces 133 corresponding to the edge portion of the disk 20. The protruding surface 135 can be an inclined surface.

According to the above configuration, when the disk 20 vibrates due to the external impact, the edge portion of the disk 20 contacts the protruding surface 135 first. In detail, since a chamfer 22 is typically formed at the edge portion of the disk 20, when the vibrations are generated in the disk 20, the edge portion of the chamfer 22 collides against the protruding surface 135. Accordingly, the vibrations of the disk 20 are restricted and simultaneously a data recording surface of the disk 20 is prevented from contacting the protruding surface 135 and the disk facing surfaces 133. Therefore, the recording surface of the disk 20 can be prevented from being damaged by the collision.

According to the present embodiment, when the disk 20 vibrates, the edge portion of the disk 20 collides against the protruding surface 135 of the extended portion 130. Since the extended portion 130 has a thickness thicker than the support portion 120, the extended portion 130 is less likely to be deformed by the collision with the disk 20. Also, according to the present embodiment, when the disk 20 vibrates, the edge portion of the disk 20 does not collide with the support portion 120. Thus, if the support portion 120 is deformed by repeated collision between the disk 20 and the support portion 120, the conventional problem of the deterioration of the head loading/unloading function of the support portion 120 does not occur.

The fixed portion 110, the support portion 120, and the extended portion 130 configured as above can be integrally formed by plastic injection mold. Thus, since the ramp 100 according to the present embodiment forms a single part on the whole, handling or assembly of the ramp 100 is made easy. However, the ramp 100 can be configured by separately manufacturing the fixed portion 110, the support portion 120, and the extended portion 130 and combining these elements using a specified combining unit.

Figure 8:
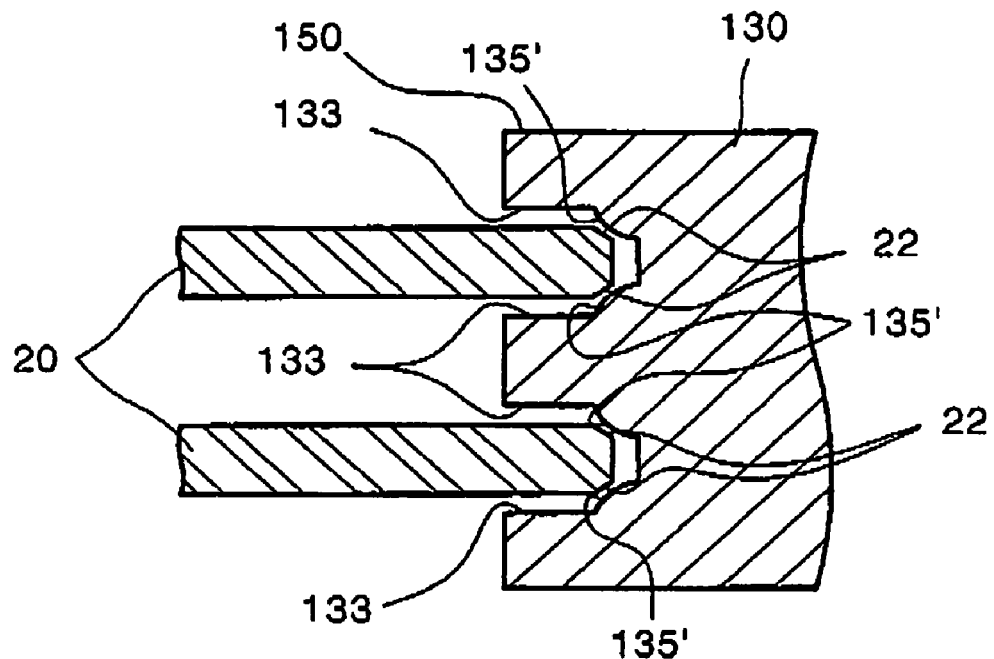
FIG. 8 is a vertical sectional view illustrating a first modification of the extended portion of the ramp of FIG. 6.
Figure 9:
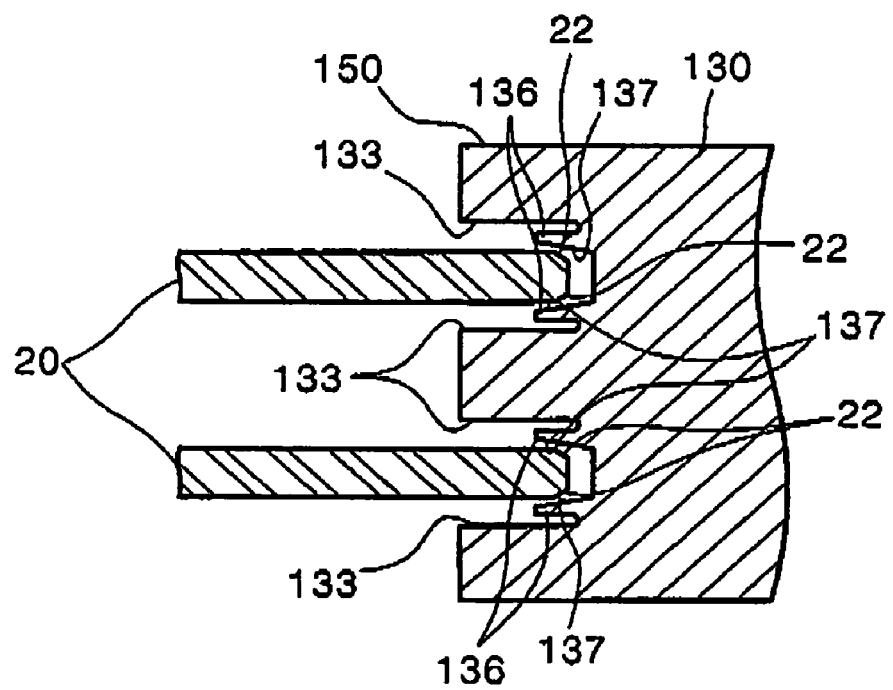
FIG. 9 is a vertical sectional view illustrating a second modification of the extended portion of the ramp of FIG. 6.

FIGS. 8 and 9 show modified examples of the ramp shown in FIG. 6. Referring to FIG. 8, a protruding surface 135' is formed at a position of each of the disk facing surfaces 133 of the extended portion 130 corresponding to the edge portion of the disk 20. The protruding surface 135' is a curved surface bulging toward the edge portion of the disk 20.

When the protruding surface 135' is a curved surface, during the vibration of the disk 20, the surface of the chamfer 22 formed at the edge portion of the disk 20 contacts the protruding surface 135'. Thus, an amount of impact applied to the extended portion 130 by the collision between the disk 20 and the protruding surface 135' decreases so that abrasion of the edge portion of the disk 20 due to the collision can be reduced.

Referring to FIG. 9, instead of the protruding surfaces 135 of 135' formed at each of the disk facing surfaces 133, a plurality of buffer protrusions 136 capable of restricting vibration of the disk 20 and absorbing impacts can be provided at the extended portion 130. The buffer protrusions 136 having a plate shape can protrude from the extended portion 130 separated a specified distance from and parallel to the disk facing surfaces 133.

During the vibration of the disk 20 by an external impact, the edge portion of the disk 20 contacts the buffer protrusions 136 so that the vibration of the disk 20 can be restricted. In particular, the buffer protrusions 136 having a plate shape have a leaf spring function so as to absorb an impact applied to the disk 20.

The disk facing surface 137 of each of the buffer protrusions 136 can be inclined. In this case, since the edge portion of the disk 20 only contacts the disk facing surface 137 of each of the buffer protrusions 136, a damage to the recording surface of the disk 20 can be prevented more definitely.

Figure 10:
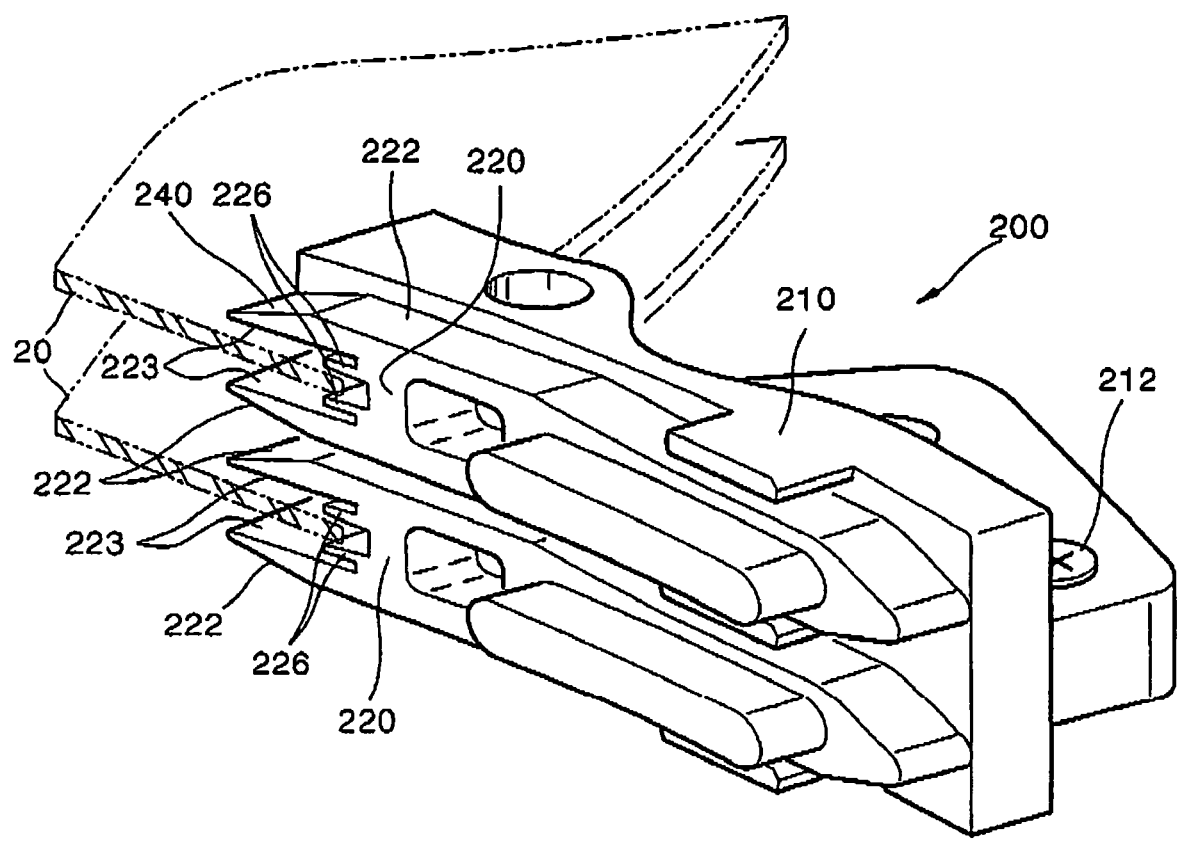
FIG. 10 is a magnified perspective view illustrating the head parking ramp according to a second embodiment of the present invention.

FIG. 10 shows a head parking ramp according to a second embodiment of the present invention. Referring to FIG. 10, a head parking ramp 200 according to the second embodiment of the present invention includes a fixed portion 210 fixed to the base member 10 of FIG. 5, a support portion 220 supporting an end portion of the actuator 30 of FIG. 5, that is, the end-tab 36 of FIG. 5, and a plurality of buffer protrusions 226 provided at the support portion 220. That is, the head parking ramp 200 has buffer protrusions 226 capable of restricting the vibration of the disk 20 and absorbing an impact are provided at the support portion 220, instead of having the extended portion 130 in the first embodiment.

The fixed portion 210 is fixed to the base member 10 of FIG. 5 using a fixing screw 212 at a position close to the outer edge portion of the disk 20 as in the first embodiment.

The support portion 220 extends from the fixed portion 210 toward the disk 20 and a leading end portion 240 of the support portion 220, that is, the end portion thereof toward the disk 20, overlaps each of the upper and lower surfaces of the outer circumferential portion of the disk 20. The support portion 220 includes a plurality of support surfaces 222 contacting and supporting the end portion, that is, the end-tab 36, of the actuator 30 where the head is installed when the rotation of the disk 20 stops, and a plurality of disk facing surfaces 223 facing each of the upper and lower surfaces of the disk 20.

The buffer protrusions 226 are arranged between the disk facing surface 223 of the support portion 220 and the edge portion of the disk 20 and separated a specified distance from each of the disk facing surface 223 and the disk 20. In detail, the buffer protrusions 226 can protrude parallel to the disk facing surface 223 in a state of being separated a specified distance from the disk facing surface 223. Like the modified example as shown in FIG. 9, a disk facing surface of each of the buffer protrusions 226 can be an inclined surface.

When the disk 20 vibrates due to an external impact, the edge portion of the disk 20 contacts the buffer protrusions 226 and accordingly the vibration of the disk 20 can be restricted. In particular, the buffer protrusions 226 having a plate shape have a function of a leaf spring so as to absorb an impact applied to the disk 20. Thus, even when the buffer protrusions 226 are formed on the support portion 220 of the ramp 200 supporting the head, the impact transferred from the disk 20 to the support portion 220 is alleviated by the buffer protrusions 226 so that the support portion 220 of the ramp 200 is prevented from being deformed by the impact. Thus, stable and reliable loading/unloading of the head can be maintained.

The head parking ramp for a data storage device according to the above-described embodiments of the present invention, even when vibrations are generated in the disk due to an external impact, since the edge portion of the disk first contacts the protruding surface formed on the disk facing surface of the extended portion of the ramp, a damage to the recording surface of the disk can be prevented. Also, since the edge portion of the disk contacts the extended portion not the support portion supporting the head, deformation of the support portion due to the collision between the disk and the support portion is not generated.

Also, when the buffer protrusions are formed on the support portion of the ramp, the impact transferred from the disk to the support portion is reduced by the buffer protrusions so that the deformation of the support portion of the ramp due to the collision is prevented. Thus, stable and reliable loading/unloading of the head can be maintained.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A head parking ramp for a data storage device to park a read/write head at a position out of a disk, comprising:
    a fixed portion fixed to a base member;
    an extended portion extending from the fixed portion toward the disk, having a lead end portion overlapping each of an upper surface and a lower surface of an outer circumferential portion of the disk, and having a plurality of disk facing surfaces facing each of the upper and lower surfaces of the disk; and
    a plurality of flat buffer protrusions having a first end secured to the extended portion and a second non-secured end, the flat buffer protrusions having an inner surface closest to each of the upper and lower surfaces of the disk and an outer surface closest to the disk facing surfaces, wherein the outer surface extends from the first end to the second end substantially parallel to the disk facing surfaces and the inner surface extends from the first end to the second end at an incline with respect to the upper and lower surfaces of the disk, the flat buffer protrusions being arranged between the disk facing surfaces of the extended portion and the edge portion of the disk to be separated a specified distance from each of the disk facing surfaces and the disk and restricting a vibration of the disk and absorbing an impact by allowing the edge portion of the disk to contact the buffer protrusions when the disk vibrates.

2. The head parking ramp as claimed in claim 1, wherein the buffer protrusions have a function of a leaf spring.

3. The head parking ramp as claimed in claim 2, further comprising a support portion extending from the fixed portion toward the disk and supporting an end portion of an actuator where the read/write head is installed.

4. The head parking ramp as claimed in claim 3, wherein a leading end portion of each support surface is inclined.

5. A head parking ramp for a data storage device to park a read/write head at a position out of a disk, comprising:
    a fixed portion fixed to a base member;
    a support portion extending from the fixed portion toward the disk, having a lead end portion overlapping each of an upper surface and a lower surface of an outer circumferential portion of the disk, having support surfaces supporting an end portion of an actuator where the read/write head is mounted, and having a plurality of disk facing surfaces facing each of the upper and lower surfaces of the disk; and
    a plurality of flat buffer protrusions having a first end secured to the support portion and a second non-secured end, the flat buffer protrusions having an inner surface closest to each of the upper and lower surfaces of the disk and an outer surface closest to the disk facing surfaces, wherein the outer surface extends from the first end to the second end substantially parallel to the disk facing surfaces, and the inner surface extends from the first end to the second end at an incline with respect to the upper and lower surfaces of the disk, the flat buffer protrusions being arranged between the disk facing surfaces of the support portion and the edge portion of the disk to be separated a specified distance from each of the disk facing surfaces and the disk, and restricting a vibration of the disk and absorbing an impact by allowing the edge portion of the disk contact the buffer protrusions when the disk vibrates.

6. The head parking ramp as claimed in claim 5, wherein the buffer protrusions have a function of a leaf spring.

7. A head parking ramp system, comprising:
    a disk having chamfered outer edges;
    a support portion extending from a fixed portion toward the disk and supporting an end portion of an actuator where a read/write head is located;
    an extended portion extending in a direction from the fixed portion toward the disk, having end portions extending in the direction adjacent to opposing surfaces of the disk, each end portion having a disk facing surface facing an adjacent surface of the disk; and a plurality of flat buffer protrusions having a first end secured to the extended portion and a second non-secured end, the flat buffer protrusions having an inner surface closest to each of the upper and lower surfaces of the disk and an outer surface closest to the disk facing surfaces, wherein the outer surface extends from the first end to the second end substantially parallel to the disk facing surfaces, and the inner surface extends from the first end to the second end at an incline with respect to the upper and lower surfaces of the disk, the flat buffer protrusions being arranged between the disk facing surfaces and the outer edges and restricting a vibration of the disk and absorbing an impact by allowing the edge portion of the disk to contact the buffer protrusions when the disk vibrates.

8. A head parking ramp for a data storage device to park a read/write head at a position outside of a disk, comprising:

a fixed portion fixed to a base member;

an extended portion extending from the fixed portion toward the disk, having a lead end portion overlapping each of an upper surface and a lower surface of an outer circumferential portion of the disk, and having a plurality of disk facing surfaces facing each of the upper and lower surfaces of the disk; and means for restricting a vibration of the disk using a plurality of flat buffer protrusions arranged between the disk facing surfaces of the extended portion and an edge portion of the disk whereby the edge portion of the disk contacts the buffer protrusions when the disk vibrates.

* * * * *